Nov. 24, 1931.　　　T. R. HARRISON　　　1,833,112

THERMOELECTRIC LIQUID LEVEL INDICATOR

Filed July 9, 1925

INVENTOR
Thomas R. Harrison
BY
John E. Hubbell
ATTORNEY

Patented Nov. 24, 1931

1,833,112

UNITED STATES PATENT OFFICE

THOMAS R. HARRISON, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

THERMOELECTRIC LIQUID LEVEL INDICATOR

Application filed July 9, 1925. Serial No. 42,430.

The general object of the present invention is to provide improved means for determining the height of liquid level in a container when the liquid therein is at a temperature different from that of the atmosphere surrounding the container. With such apparatus, the temperature of the portion of the container wall in direct contact with the liquid will be different from the temperature of the portion of the container wall above the liquid level because the heat conductivity of the liquid is better than that of the gas, air, or vapor in the space within the container above the liquid level. As a result of this difference in heat conductivity, the portion of the container wall in direct contact with the liquid will be of approximately the same temperature as the liquid, whereas the temperature of the portion of the container wall above the liquid level will be something intermediate the temperature of the gas or vapor space within the container and the temperature of the surrounding atmosphere. In consequence, if the container is the shell of a boiler or oil still, for example, which is swept externally by heating gases at a temperature above the temperature within the shell, the temperature of the portion of the shell wall above the liquid level will be higher than the temperature of the portion of the shell in direct contact with the contained liquid. Similarly, if the container is a boiler water column, for example, which is connected at top and bottom to a boiler, respectively, above and below, the liquid level therein, and is externally exposed to the atmosphere, the temperature of the portion of the column wall below the liquid level will also be appreciably lower than the temperature of the portion of the column wall above the liquid level. In the case of a boiler water column, the liquid in the water column is normally at a temperature appreciably below the boiler temperature, whereas the temperature in the vapor space approximates the boiler temperature, steam entering the vapor space as required to compensate for condensation therein.

In accordance with the present invention the height of liquid level is determined by means of a thermo-couple having its hot and cold junction temperatures dependent one on the temperature of a portion of the liquid container wall normally below the container liquid level, and the other on the temperature of a portion of said wall normally above said liquid level. When a thermo-couple, arranged in the manner described, is connected to a galvanometer, the latter will, as is well known, give an indication which is dependent on the difference between the hot and cold junction temperatures. A rise or fall of the liquid level sufficient to subject both junctions of the thermo-couple to approximately the same temperature, will result, of course, in a marked change in the galvanometer indication. Furthermore, as the liquid level fluctuates through a range close to one of the thermo-couple junctions.

The temperature of the latter will vary as the distance between it and the liquid level varies because of the flow of heat through the container wall in a direction toward or away from the liquid level. In consequence, such fluctuations of the liquid level will result in significant variations in the galvanometer indications.

In a simple mode of carrying out the invention, the metal wall of liquid container forms one of the metallic elements of the thermo-couple, though, of course, the thermo-couple may be wholly independent of the container wall. The thermo-couple E. M. F. to which the galvanometer is subjected, may obviously be increased by the use of a plurality of thermo-couples connected in series with the galvanometer and each having its cold junction exposed to the temperature of the container wall at one level, and its hot junction exposed to the temperature of the wall at a different level.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Figure 1:
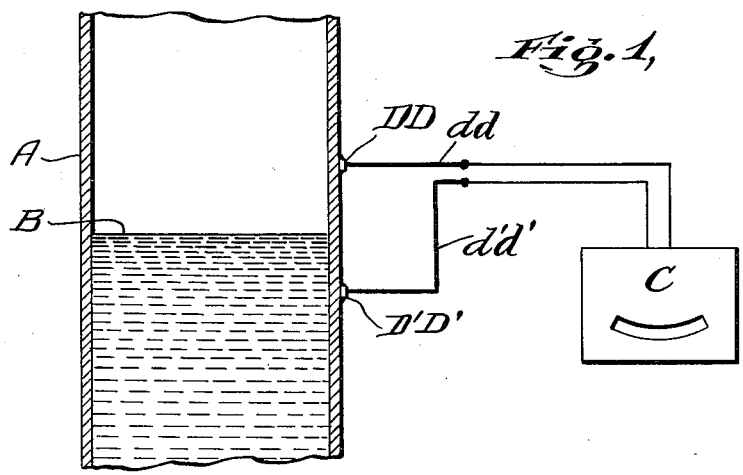
Fig. 1 is a somewhat diagrammatic representation of one embodiment of the invention.

In the drawings, A represents the metallic wall of a liquid container which may be a boiler shell, an oil still, a boiler water column, or other container for liquid at a temperature different from the temperature of the atmosphere surrounding the container.

Metal parts $dd$ and $dd'$ are secured to the container wall A at different levels, and in consequence the metal part $dd$ and container wall A will form the hot junction DD, and the metal part $dd'$ and the container wall A will form the cold junction DD' of a thermo-couple, if the portion of the wall A adjacent the metal part $dd$ is at a higher temperature than is the portion of the wall A immediately adjacent the metal part $dd'$. That temperature relation will exist under certain conditions, as has been explained, if the part $dd$ is above, and the part $dd'$ is below the liquid level in the container A. With the arrangement shown, the electrical indicating instrument C will exhibit a thermo-electric E. M. F. dependent on the difference in temperature of the junctions DD and DD'. If the junction DD is located at a level which is always above the liquid level in the container A, while the junction DD' is located at a level below the normal liquid level, but above the level of the liquid under some conditions, the electro-motive force of the thermo-couple to which the instrument E responds, will exhibit one value with the normal height of liquid level, and as the liquid level falls into proximity with the level of the junction DD' will give decreasing indications as a result of the flow of heat from the portion of the wall A immediately above and below the liquid level to the wall portion immediately above that level; and finally when the liquid level falls to or a little below the level of the part DD', the instrument will indicate no thermo-couple E. M. F. at all. Also, if the junction DD' is always below the liquid level, as may well be the case in practice, the E. M. F. will be below zero when the liquid level reaches junction DD, since DD and DD' will then be at equal temperatures, and as the level becomes lower the temperature of junction DD departs more widely from the liquid temperature and thus producing increasing E. M. F. with lowering liquid level.

Figure 2:
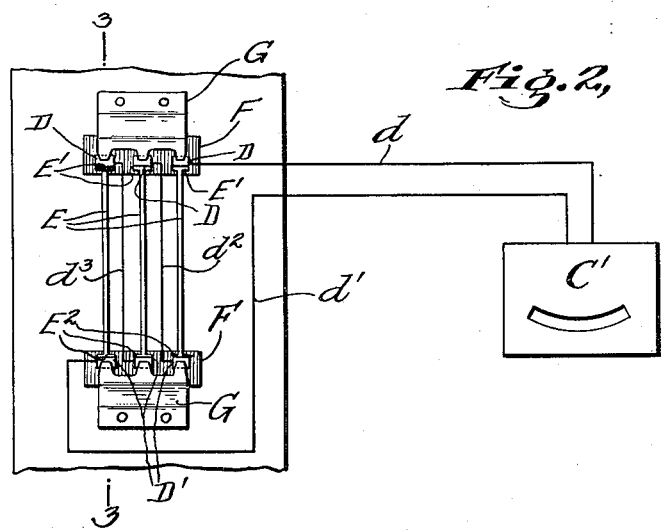
Fig. 2 is an elevation illustrating a second form of embodiment.
Figure 3:
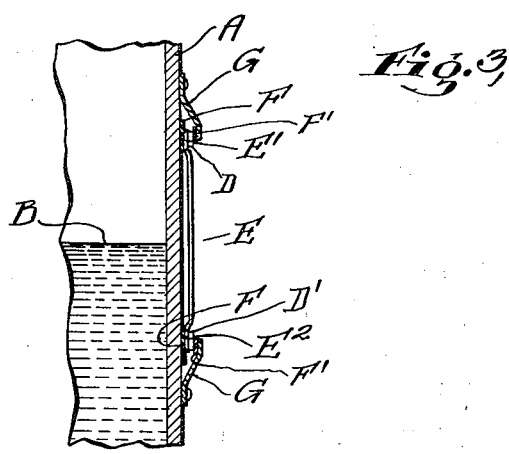
Fig. 3 is a section on the line 3—3 of Fig. 2.

In lieu of using the metal wall of the container as one element of the thermo-couple, the latter may be electrically insulated from said wall and may comprise a bar E of suitable metal having upper and lower ends E' and E², to which a suitable dissimilar metal is connected at D and D', respectively, as shown in Figs. 2 and 3. When the thermo-couple is thus electrically separated from the wall A, there may be a plurality of such elements E connected in series with one another and the instrument C' by conductors $d, d', d^2$, and $d^3$, as shown in Fig. 3. The thermo-couple parts E in this form should be insulated from the metal wall A as by means of the insulation sheets F, and may be held firmly against the shell of the boiler A to insure a good and definite heat transfer relation between the shell and the thermo-couple element end portions E' and E², as by means of clamping parts G secured to the wall, A insulation F' being interposed between the clamps G and the thermo-couples. With a plurality of thermo-couples in series as shown in Fig. 2 and Fig. 3, the galvanometer employed need not be as sensitive as is required with the arrangement shown in Fig. 1.

While in accordance with the provisions of the statutes, I have illustrated and described the best form of embodiment of my invention now known to me, it will be apparent to those skilled in the art that changes may be made in the form of apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination with a container partially filled with liquid at a temperature different from that of the atmosphere surrounding the container, of thermo-electric liquid level determining means, comprising a thermo-couple having its hot and cold junctions exposed to the temperatures of the wall of said container at different levels so located that the difference between the temperatures of said thermo-couple junctions will be significantly affected in normal operation by heat flow in the container wall in a direction transverse to said liquid level, and means responsive to the thermo-couple electro-motive force.

2. The combination with a container partially filled with liquid at a temperature different from that of the atmosphere surrounding the container, of thermo-electric liquid level determining means, comprising a plurality of thermo-couples each having its hot junction exposed to the temperature of the wall of said container at one level so located that the difference between the temperatures of said thermo-couple junctions will be significantly affected in normal operation by heat flow in the container wall in a direction transverse to said liquid level, and each having its cold junction exposed to the temperature of said wall at a different level, and a measuring instrument connected in series with said thermo-couples.

3. The combination with the shell of a steam generating boiler, of thermo-electric liquid level determining means comprising a thermo-couple having its hot and cold junctions exposed to the temperature of said shell, one at a level below, and the other at a level above the normal water level in said shell.

4. The combination with a container partially filled with liquid at a temperature different from that of the atmosphere surrounding the container, of thermo-electric means for determining the height of liquid level in the container, comprising thermo-electric hot and cold junctions subjected to the temperature of portions of said wall at different levels so located with respect to the normal range of liquid level in said container that the temperature of one at least, of said portions will normally be significantly affected by heat flow in the wall between the last mentioned portion and the portion of the wall immediately adjacent the liquid level, and indicating means responsive to the thermo-couple electro-motive force.

5. The combination with a container having its wall formed of metal and partially filled with liquid at a temperature different from that surrounding the container, of two parts attached to said container wall, one at a level above and the other at a level below the normal liquid level in the container and formed of metals dissimilar from the first mentioned metal and uniting with the latter to form a thermo-couple, and a measuring instrument connected to said metal parts.

Signed at Philadelphia, in the county of Philadelphia, and State of Pennsylvania, this 30th day of June, A. D. 1925.

THOMAS R. HARRISON.